Patented July 21, 1953

2,646,404

UNITED STATES PATENT OFFICE 2,646,404

PROCESS FOR BREAKING PETROLEUM WATER-IN-OIL EMULSIONS

William B. Hughes and Everett B. Fisher, Bartlesville, Okla., assignors to Cities Service Research and Development Company, New York, N. Y., a corporation of New Jersey No Drawing. Application December 2, 1950, Serial No. 198,915

6 Claims. (Cl. 252—338)

This invention relates to a process of resolving water-in-oil emulsions of the type commonly met with in crude oil production.

One of the most troublesome oil field problems relates to the breaking of water-in-oil emulsions formed in wells producing both water and brine. These emulsions are generally of two types, the first type a mechanically cut emulsion, which is usually formed in the well by faulty pumping equipment, the other type being a gas-cut emulsion, the formation of which is aided by the emulsifying action of certain asphaltenes and other chemical emulsifiers present in the crude oil. The emulsion commonly encountered is a mixture of both of these types, and its properties will vary from well to well, and even from day to day in the same well. Unless these emulsions can be effectively and completely broken, the oil content is lost. It is also desirable that the emulsion be broken as rapidly as possible, in order to keep the number and size of the settling tanks to a minimum.

There are apparently two phases of an emulsion resolving problem. The first involves a surface phenomenon in which the oil film surrounding the water particles of micron size is weakened, allowing the particles to coalesce into larger droplets. This phase will be hereinafter referred to as the emulsion breaking step. The other phase involves the splitting of the broken emulsion into separate oil and water phases. This phase will be referred to as the water separation step.

It will be evident from the foregoing that the ideal emulsion resolving agent must be effective to break both mechanical-cut and gas-cut emulsions with substantially equal facility, must rapidly break the emulsion, and must be effective in causing rapid water separation from the broken emulsion. The agent must also be effective in very small concentrations, in order to hold the treating cost to a minimum. Many emulsion resolving agents have been proposed in the past, but none of which we are aware are effective to accomplish all of the desired results. Thus one agent may be effective to break gas-cut emulsions, but not the mechanical-cut type; another may be a good emulsion breaker but have poor water-separation qualities; while still another may show good water-separation qualities but may fail to break the emulsion completely.

It is an object of this invention to provide a series of compositions which will rapidly resolve emulsions of all types, giving rapid break and complete water separation.

It is a further object of this invention to provide a series of compositions suitable for down-the-well injection which will not only resolve emulsions or prevent the formation thereof, but which will also protect the metal parts of the well from corrosion by oil well brines.

It has been found that emulsion resolving agents which will accomplish the objects set forth above may be produced by neutralizing the reaction product of two mols of an amine with one mol of a carbonyl to a methyl orange end point with a propylated naphthalene sulfonic acid.

When reacting the amine with an aldehyde the reaction commences spontaneously upon mixing the materials, and will normally go to completion at ambient temperatures within a matter of a few hours. We have found it desirable, however, to heat the mixture in order to speed up the reaction and to insure that it goes to completion. When heated to about 100° C. the reaction is complete in about one-half hour. The product, an oily liquid, may then be separated from the water formed in the reaction by any suitable method, such as centrifuging or decanting. When using a ketone as a reagent instead of an aldehyde, the reaction is slower and for this reason we prefer to use a catalytic quantity of an acid such as paratoluene sulfonic acid to initiate the reaction, although it is not absolutely necessary. After the reaction has started, the material is treated in the same way as when using an aldehyde, and a very similar product is obtained.

Nonaromatic amines such as the alkyl and alkanol amines, both primary and secondary, and the saturated heterocyclic amines such as morpholine are useful as starting material. Such aromatic amines as we have tested have not, however, given satisfactory results.

Among the amines which we have found useful in preparing our various compositions are mono- and diethanol amine, mono- and diethyl amine, mono- and diamyl amine, octyl amine, nonyl amine, hexadecyl amine, octadecyl amine, diethylenetriamine, triethylenetetramine, diacetone amine, N-octyl acetone amine, morpholine and mixtures thereof. We have also found that commercial mixtures of amines containing amines ranging from $C_8$ to $C_{18}$ and averaging $C_{12}$ to $C_{14}$ are equally satisfactory for our purposes. In general it has been found that the most satisfactory results are obtained when amines in the $C_8$ to $C_{12}$ range are used. Higher and lower amines yield products which in general compare favorably with commercial emulsion breakers presently in use, but are not as efficient as compositions prepared from our preferred amines.

The nature and molecular weight of the carbonyl component of our new compositions is not critical and may be alkyl, aryl, or heterocyclic. Among the aldehydes which we have found entirely satisfactory may be included formaldehyde, acetaldehyde, furfural, benzaldehyde, heptaldehyde, ethyl hexaldehyde, and nonyl aldehyde. Among the ketones which we have found entirely satisfactory may be included methyl-N-amyl ketone, acetone, methyl ethyl ketone, diethyl ketone, di isopropyl ketone, methyl-N-hexyl ketone, 3-methyl hexene-2-one-4, methyl isopropyl ketone, methyl isobutyl ketone, mesityl oxide, and acetophenone.

The exact nature of the products produced by the reaction of two amines with one carbonyl is not known, but it is believed that a large number of highly complex condensation or reaction products are formed. In order to determine whether or not any principal products could be isolated and their structure determined, the products from several reactions were carefully fractionated. However, no appreciable flats could be observed in the fractionation curves, and at most only about 5 to 10 per cent of the product could be isolated in anything approaching a pure form. These semipurified cuts were also neutralized with the propylated naphthalene sulfonic acid, but apparently were no more effective in resolving emulsions than the crude product similarly neutralized. Obviously, in commercial practice it is preferable to utilize the crude product rather than going to the difficulty and expense of separating purified fractions from the crude.

The propylated naphthalene sulfonic acid which we use as the neutralizing agent for our intermediate compositions may be prepared according to the directions given by Walker in U. S. Patent No. 1,873,165. The compound has the formula:

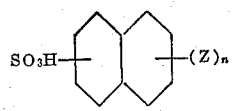

in which Z is an isopropyl radical and $n$ is a whole number from 1 to 4. Other organic acids, such as stearic acid and petroleum green acids have been tried as neutralizers, but the products are far inferior in emulsion-breaking qualities.

The propylated naphthalene sulfonic acid may be used by itself to neutralize the various compositions described above, or two mols of the acid may be coupled with one or two methylene linkages by reaction with formaldehyde, and the coupled acid may be so used, forming a ring structure which in some instances appears to be considerably more effective than the intermediate product neutralized with the uncoupled acid. Neutralization is accompanied by the evolution of considerable heat, and by a definite color change from light brown to dark brown, the final product being a viscous liquid. The products may be used as such, but since they are generally too viscous for injection into oil gathering lines, we prefer to dilute them to a viscosity suitable for easy handling with kerosene or other suitable mineral oil.

In order to properly evaluate the various compositions, they were subjected to a number of different tests. In one of such tests they were tested at well heads, using fresh emulsion from the well. The test procedure consists essentially of measuring out a 100 ml. sample of the well fluid, adding a measured amount of a 4 per cent dilution of the particular composition in a solvent, shaking 100 times, and allowing to stand for fifteen minutes. The water separation is then observed, and the breaking action is judged by either centrifuging or by pouring a small amount of the composition onto a glass plate and observing the color of the film. Successive tests are then made using smaller and smaller amounts of the chemical until the minimum concentration which gives good breaking and water drop-out action is found.

Results of testing of typical compositions at five different Kansas wells is given in Table I below in which PNS stands for propylated naphthalene sulfonic acid; p. p. m. indicates the parts of breaker per million parts of emulsion; B indicates the effectiveness of the breaker on breaking the emulsion; W indicates the effectiveness of the breaker on water drop-out; P indicates poor emulsion break or water drop-out; F indicates fairly good breaking or water drop-out; G indicates a nearly complete breaking or above 90 per cent water drop-out; and E indicates excellent results with complete break or water drop-out.

Well No. 1 was an Arbuckle producer having an emulsion readily broken by small amounts of chemical treating agents; well No. 2 was also an Arbuckle producer yielding a mechanically cut emulsion which could not be completely broken even with heavy dosages of commercially available treating agents; well No. 3 was an Arbuckle producer with a medium hard to break emulsion which, however, could be broken with somewhat larger amounts of treating agents than the emulsion of well No. 1; well No. 4 was a Viola producer with a medium hard to break emulsion; and well No. 5 was an Arbuckle producer yielding a medium hard to break emulsion. Blanks in the table indicate that the composition was not tested at the particular well.

While the results in the table are given only for wells in the Kansas area, the compounds have also been tested with excellent results in other fields, yielding emulsions of varying characteristics.

Table I

| Compound | Well No. 1 | | | Well No. 2 | | | Well No. 3 | | | Well No. 4 | | | Well No. 5 | | |
|---|---|---|---|---|---|---|---|---|---|---|---|---|---|---|---|
| | p. p. m. | B | W | p. p. m. | B | W | p. p. m. | B | W | p. p. m. | B | W | p. p. m. | B | W |
| octylamine-acetaldehyde-PNS | 200 | E | E | 1,600 | E | E | 140 | E | E | 400 | E | E | 120 | E | E |
| octylamine-heptaldehyde-PNS | 150 | E | E | 200 | E | E | 140 | E | E | 150 | E | E | 120 | E | E |
| octylamine-furfural-PNS | 200 | E | E | 1,600 | E | E | 140 | E | E | 400 | E | E | | | |
| octylamine-benzaldehyde-PNS | 200 | E | E | 1,600 | E | E | 140 | E | E | 400 | E | E | | | |
| nonylamine-formaldehyde-PNS | 150 | G | E | | | | 300 | E | E | 300 | E | E | | | |
| hexadecylamine-acetaldehyde-PNS | 200 | E | E | 1,600 | E | E | 350 | E | E | 400 | E | E | | | |
| mixture of crude alkylamines averaging C₁₂-formaldehyde-PNS | 150 | E | E | | | | 200 | E | E | 300 | G | E | 120 | E | E |
| diethylenetriamine-heptaldehyde-PNS | 250 | G | E | | | | 250 | E | E | 250 | G | E | 300 | G | E |
| N-octyl acetone amine-formaldehyde-PNS | 200 | E | E | | | | 250 | G | F | 300 | F | P | 300 | G | E |
| amylamine-heptaldehyde-PNS | 400 | E | E | 1,600 | E | E | 350 | E | E | 400 | G | P | | | |
| ethanolamine-heptaldehyde-PNS | 400 | E | E | 1,600 | G | P | 350 | E | E | 400 | F | P | | | |

In order further to evaluate the efficiency of our new compositions, tests were also made at the well heads with a number of commercial emulsion breakers, and it was found that the best of our new compounds were far superior to any commercial emulsion breaker tested. Results of these tests are given in the following table:

then remaining was measured, and a relative efficiency for the particular breaker was determined by comparing this amount with the amount of emulsion remaining in a sample treated in the same manner with the same quantity of the standard emulsion breaker. Thus if a sample of emulsion treated with the standard emulsion breaker showed 3 mls. of emulsion still

Table II

| Breaker | Well No. 1 | | | Well No. 2 | | | Well No. 3 | | | Well No. 4 | | | Well No. 5 | | |
|---|---|---|---|---|---|---|---|---|---|---|---|---|---|---|---|
| | p. p. m. | B | W | p. p. m. | B | W | p. p. m. | B | W | p. p. m. | B | W | p. p. m. | B | W |
| A. octylamine-heptaldehyde-PNS | 150 | E | E | 100 | E | E | 140 | E | E | 150 | E | E | 120 | E | E |
| B. octylamine-formaldehyde-PNS | 200 | E | E | 200 | E | P | 140 | E | E | 150 | E | E | 120 | E | E |
| C. mixture of crude alkylamines averaging C₁₂-formaldehyde-PNS | 150 | E | E | 200 | E | E | 140 | E | E | 150 | E | E | 120 | E | E |
| D. mixture of crude alkylamines averaging C₁₂-mixed lower molecular weight aldehydes-PNS | 150 | E | E | | | F | 140 | E | E | 150 | E | E | | | |
| E. Commercial #1 | 1,300 | E | E | 1,600 | G | F | 1,600 | G | E | 1,000 | G | E | 800 | F | E |
| F. Commercial #2 | 300 | E | E | 900 | F | F | 300 | E | E | 400 | E | E | 300 | G | F |
| G. Commercial #3 | | | | 900 | F | F | | | | | | | | | |
| H. Commercial #4 | | | | 900 | F | F | | | | | | | | | |
| I. Commercial #5 | 300 | E | E | 900 | G | F | 400 | E | E | 300 | E | E | 300 | G | F |
| J. Commercial #6 | | | | 900 | F | F | | | | | | | | | |
| K. Commercial #7 | | | | 280 | G | G | | | | | | | | | |
| L. Commercial #8 | | | | 900 | F | F | | | | | | | | | |
| M. Commercial #9 | | | | 900 | F | F | | | | | | | | | |
| N. Commercial #10 | | | | 150 | G | E | | | | | | | | | |

It will be observed from the foregoing that our new compositions will give excellent results both as to breaking action and water drop-out with much smaller concentrations of breaker than any of the best commercial breakers available, and that even the best of the breakers tested did not give a complete break at well No. 2, whereas all three of our compositions gave a 100 per cent break.

Since the breaker composed of heptaldehyde, octylamine, and propylated naphthalene sulfonic acid had proven by far the best of the breakers in the preliminary field evaluation, it was decided that for tests on later developed compositions that this breaker should be used as a standard to determine the relative efficiency of the other breakers. In order to avoid the expense and time involved in field tests at the well, the following procedure was developed to evaluate the relative efficiency of the breakers as compared with the standard breaker. Samples of emulsions from representative wells were brought to a central point. The breaker was made up as a four volume per cent solution in a 75 per cent xylene—25 per cent methanol mixture in order that the amount of the active ingredient could be accurately measured. A measured amount of this breaker was then added to a 50 ml. sample of emulsion and shaken one hundred times to insure adequate mixing. It was then allowed to stand for fifteen minutes, followed by centrifuging for ten minutes. The amount of emulsion left unbroken and a sample treated with a new breaker showed only 1½ mls. left unbroken, the new emulsion breaker would have a value of 200 per cent based upon the standard breaker. Likewise, if 6 mls. of emulsion were left unbroken, the new breaker would have a value of 50 per cent of the standard emulsion breaker.

The new emulsion breakers were in all cases tested on a number of emulsions from different wells in order that a good comparison might be had with the standard emulsion breaker. Results of representative breakers of the ketone type are contained in the following table. In all cases the amine used was a mixture of higher molecular weight amines as obtained commercially and averaging $C_{12}$ to $C_{14}$ and the neutralizing agent was propylated naphthalene sulfonic acid. Therefore only the ketone used will be given in the table to describe the breaker.

Table III

| Breaker | Well No. 5 | Well No. 6 | Well No. 7 | Well No. 8 |
|---|---|---|---|---|
| Methyl-n-amyl ketone | 100 | 160 | 100 | 100 |
| Acetone | 100 | 160 | 100 | 100 |
| Methyl ethyl ketone | 100 | 160 | 100 | 150 |
| Di ethyl ketone | 100 | 160 | (¹) | 100 |
| Di isopropyl ketone | 100 | 100 | 100 | 100 |

¹ Below 100.

Having now described our invention, what is claimed is:

1. The process of resolving emulsions including subjecting a petroleum water-in-oil emulsion to the action of an emulsion breaker obtained by mixing together one mol of a carbonyl selected from the group consisting of aldehydes and ketones and two mols of an amine selected from the group consisting of nontertiary alkyl amines, alkanol amines, and heterocyclic amines, heating the mixture at a temperature sufficiently high and for a period sufficiently long to cause a reaction between the carbonyl and amine whereby to obtain water formed by the reaction of the carbonyl oxygen with amine hydrogen, together with a non-oxygenated carbonyl-amine reaction product, separating water from the reaction product, and neutralizing the reaction product with propylated naphthalene sulfonic acid whereby to obtain the desired emulsion breaker, and thereafter separating the oil and water phases of the emulsion.

2. The process according to claim 1 in which the carbonyl is heptaldehyde and the amine is octylamine.

3. The process according to claim 1 in which the carbonyl is formaldehyde and the amine is octylamine.

4. The process according to claim 1 in which the carbonyl is benzaldehyde and the amine is octylamine.

5. The process according to claim 1 in which the carbonyl is furfural and the amine is dodecylamine.

6. The process according to claim 1 in which the carbonyl is methyl ethyl ketone and the amine is dodecylamine.

WILLIAM B. HUGHES.
EVERETT B. FISHER.

References Cited in the file of this patent
UNITED STATES PATENTS

| Number | Name | Date |
|---|---|---|
| 2,110,837 | Blair | Mar. 8, 1938 |
| 2,300,555 | De Groote et al. | Nov. 3, 1942 |
| 2,303,414 | Wayne | Dec. 1, 1942 |
| 2,543,223 | Blair | Feb. 27, 1951 |